United States Patent [19]

Carobolante

[11] Patent Number: 5,204,594
[45] Date of Patent: Apr. 20, 1993

[54] CIRCUIT FOR PROVIDING A SIGNAL PROPORTIONAL TO THE AVERAGE CURRENT FLOWING THROUGH COILS OF A MOTOR OPERATED IN BOTH LINEAR AND PWM MODES

[75] Inventor: Francesco Carobolante, Phoenix, Ariz.

[73] Assignee: SGS-Thomson Microelectronics, Inc., Carrollton, Tex.

[21] Appl. No.: 770,572

[22] Filed: Oct. 3, 1991

[51] Int. Cl.[5] .............................................. H02P 6/02
[52] U.S. Cl. ................................... 318/254; 307/353; 328/151; 363/98
[58] Field of Search ........................... 363/98; 361/93; 318/254; 307/350, 353; 328/151

[56] References Cited

U.S. PATENT DOCUMENTS

| | | | |
|---|---|---|---|
| 3,541,319 | 11/1970 | James | 307/353 |
| 4,250,544 | 2/1981 | Alley | 318/254 |
| 4,562,386 | 12/1985 | Goff et al. | 318/254 |
| 4,712,050 | 12/1987 | Nagasawa et al. | 318/254 |

OTHER PUBLICATIONS

Nowicka, "Differential Amp Cancels Integrator's Crosstalk", Electronics, Dec. 18, 1980, p. 99.

*Primary Examiner*—William H. Beha, Jr.
*Attorney, Agent, or Firm*—Richard A. Bachand; Lisa K. Jorgenson; Richard K. Robinson

[57] ABSTRACT

A circuit for providing a signal proportional to the average current supplied to the coils of a motor operated in both linear and PWM modes includes a sense resistor across which a voltage representing the current flowing supplied to said coils is developed. The voltage is selectively applied to an output circuit which operates as a low pass filter circuit when drive current is supplied to the coils and as a voltage hold circuit when drive current is not supplied to the coils. The output circuit includes an amplifier connected to receive a voltage produced by the sense resistor when the motor is operated in the linear mode, and a capacitor and a resistor connected in parallel, the capacitor and resistor being connected between an input and an output of the amplifier to operate as a low pass filter circuit. A switch circuit operating in response to PWM signals disconnects the voltage developed across the sense resistor from the amplifier, and disconnects the resistor from the capacitor when drive current is not supplied to the coils to operate as a voltage hold circuit.

17 Claims, 1 Drawing Sheet

CIRCUIT FOR PROVIDING A SIGNAL PROPORTIONAL TO THE AVERAGE CURRENT FLOWING THROUGH COILS OF A MOTOR OPERATED IN BOTH LINEAR AND PWM MODES

BACKGROUND OF THE INVENTION

1. Field of the Invention

This invention relates to improvements in electrical circuits, and more particularly to improvements in electrical circuitry of the type used in estimating average current flowing in a load, and still more particularly, in one preferred embodiment, to improvements in electrical circuitry of the type used to estimate or reconstruct average current flowing in a polyphase dc motor, both in linear and pulse width modulation modes of motor operation.

2. DESCRIPTION OF THE PRIOR ART

One widely used method of sensing a current flowing in a load is to place a sensing element, such as a resistor, in a series current path between a supply voltage and the load, and measuring the voltage across it. The current can then be directly calculated by dividing the measured voltage by the value of the resistor. In some applications multiple loads exist, for example, polyphase dc motor coils, or the like, to which drive signals are switchably connected in a predetermined sequence, and for which it is necessary to measure the current flowing in the coils In typical circuits for providing drive signals to such loads, the sense resistor is usually placed between a reference potential, such as $V_{cc}$ and ground, or the switches that connect the drive current to the selected coils of the motor in accordance with the switched commutation sequence. Such schemes generally improve the common mode rejection ratio and help to implement transconductance control loops.

By placing a single sense resistor between the current switches and ground in transconductance circuits for driving the motor coils, only a single sensing element is required to convey instantaneous current information for any energized coil load. The major shortcomings of such a circuit arrangement emerge when pulse width modulation (PWM) systems are used in conjunction with the motor driver. Pulse width modulation techniques, often used to reduce the power dissipation in polyphase motors, chop the current in the coils of the motor at their peak current levels to achieve maximum torque, to allow rapid accelerations, and to reduce the power dissipated in the chip to a level proportional to the duty cycle. Typically, during this chopping, the transistor switches that control the current to the instantaneously active coils of the motor are switched on and off by a network of switching transistors.

In order for the motor to be able to be smoothly switched between the linear and PWM modes without transients appearing in the speed of the motor, it is helpful to know the value of the current flowing in the motor coils. However, during the PWM mode of operation, information which would indicate the current flowing in the motor (i.e., the voltage on the sense resistor) is present only during the "ON" time of the switches in the various current paths. When the switches are "OFF" in the PWM mode, the voltage on the sense resistor does not accurately represent the current which continues to flow in the inductive coil loads.

Several schemes have been proposed to address this problem, most requiring complicated circuit arrangements, such as complicated diode steering arrangements that insure a load current always flows through the sense resistor. Such previously proposed arrangements, however, usually require at least some energy dissipation, and generally can not be practically implemented in D-MOS switch type circuits because of the intrinsic diode associated with the typical D-MOS switching transistors used in most motor switching designs.

SUMMARY OF THE INVENTION

In light of the above, it is, therefore, an object of the invention to provide an improved circuit for measuring, sensing, estimating or reconstructing the current flowing in a load.

It is another object of the invention to provide a circuit of the type described that is useful to estimate the average current in a load when the current may be interrupted, such as in a motor driver circuit which may have switched or commutated current paths that may not always be conducting, or which may have linear or PWM operating modes.

It is another object of the invention to provide a circuit of the type described which is particularly suitable for use in such applications as motor driver circuits having different operating modes, current limiting circuits, transconductance control circuits, and the like.

It is another object of the invention to provide a circuit of the type described which eliminates the need for complicated diode control or steering circuits to insure current always flows through the sense element through which the current is to be monitored or measured.

It is yet another object of the invention to provide a circuit for use in driving a polyphase dc motor control circuitry that provides a signal proportional to an average current flowing through the motor, independently of its mode of operation (i.e., linear or PWM).

These and other objects, features and advantages of the invention will be apparent to those skilled in the art from the following detailed description of the invention, when read in conjunction with the accompanying drawings and appended claims.

In accordance with a broad aspect of the invention, a circuit is provided to generate a signal proportional to the average current flowing through the coils of a motor that is operated in both linear and PWM modes. The circuit includes a sense resistor through which current in the coils flows and an output circuit switchably connected to receive a voltage developed by the sense resistor. The output circuit operates as a low pass filter circuit when drive current is supplied to the coils and operates as a voltage hold circuit when drive current is not supplied to the coils.

The output circuit includes an amplifier connected to receive a voltage produced by the sense resistor when the motor is operated in the linear mode, and a capacitor and a resistor connected in parallel, the capacitor and resistor being connected between an input and an output of the amplifier to produce low pass filter circuit operation. A switch circuit operates in response to PWM signals to disconnect the voltage produced by the sense resistor from the amplifier, and also disconnect the resistor from the capacitor when drive current is not supplied to the coils to produce voltage hold circuit operation.

In accordance with another broad aspect of the invention, a method is presented for generating a signal proportional to the average current flowing through coils of a motor operated in both linear and PWM modes. The method includes the steps of providing a sense resistor through which current in the coils flows or across which a voltage representative of such current appears, connecting a low pass filter circuit across the sense resistor when drive current is supplied to the coils, and connecting a voltage hold circuit when drive current is not supplied to the coils. Switching between the low pass filter circuit and the voltage hold circuit is in accordance with PWM signals.

BRIEF DESCRIPTION OF THE DRAWINGS

A preferred embodiment of the invention is illustrated in the accompanying drawing, in which.

In the various figures of the drawing, like reference numerals are used to denote like or similar parts.

DESCRIPTION OF THE PREFERRED EMBODIMENTS

In accordance with a preferred embodiment of the invention, a circuit is provided that produces a signal proportional to the average current flowing through a load. The signal is proportional, without regard to the mode of operation of the load. Although a preferred use for a circuit advanced by the invention is in control circuits for providing drive signals to a polyphase dc motor, such as a sensorless and brushless three phase dc motor which operates in, for instance, linear or pulse width modulation (PWM) modes, the circuit will find advantageous use also in other circuits, as well, such as current limiting circuits, transconductance control circuits, and the like.

Figure 1:
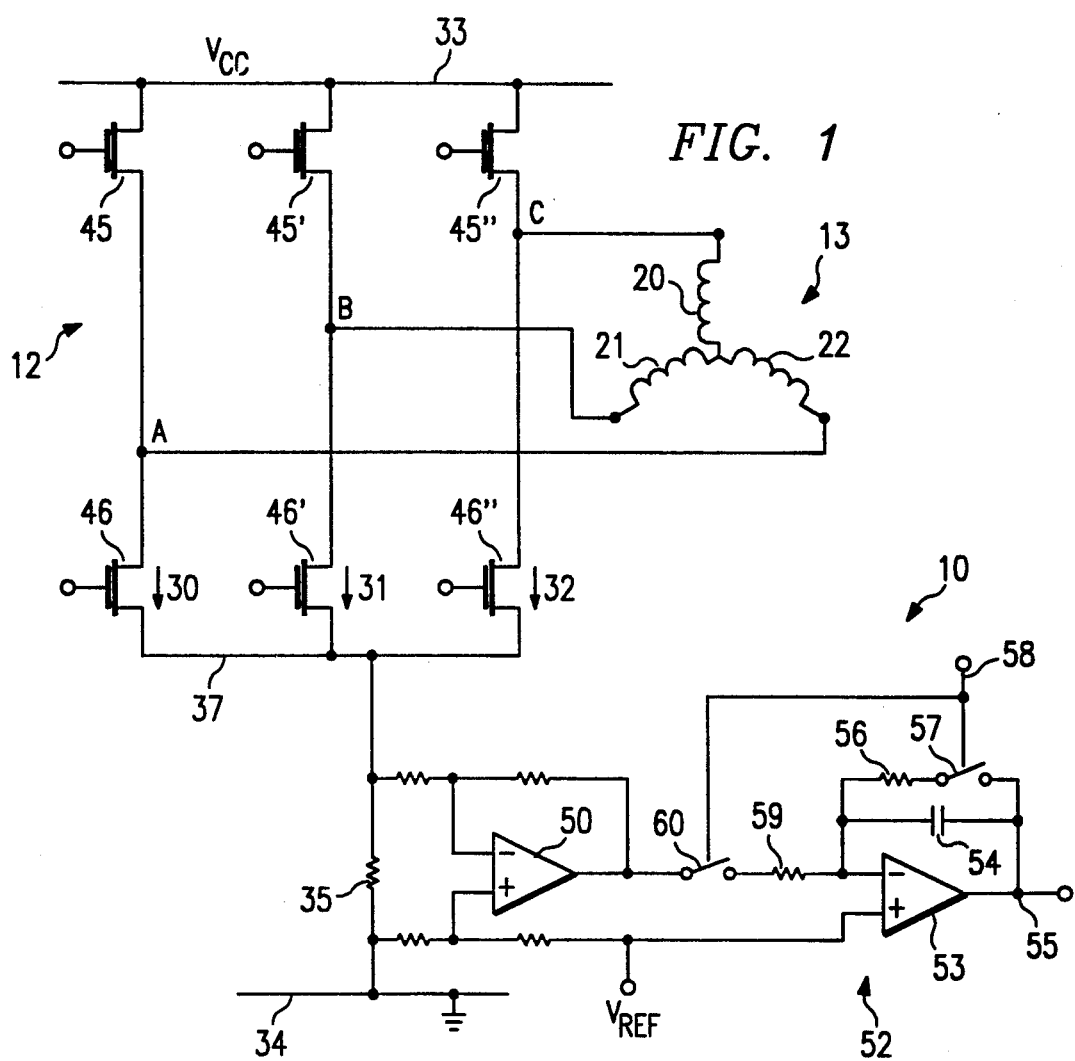
FIG. 1 is an electrical schematic diagram of a circuit for reconstructing an average load current, in accordance with a preferred embodiment of the invention, the circuit being used as an example to reconstruct the average load current in a three phase motor, and being shown in conjunction with an analog motor driver for supplying motor drive signals to the motor.

More particularly, an example of a circuit 10, in accordance a preferred embodiment of the invention, is shown in FIG. 1, used in conjunction with a three phase motor driver circuit 12. The circuit 10 is used to estimate the current flowing in the coils 13 of the motor (not shown), which can be, for example, a motor used to drive a memory disk of type found in a hard disk drive of a personal computer or the like.

The motor driver circuit 12 shown is a conventional H-bridge, commonly referred to as a triple —½—H-bridge. The H bridge 12 switchably provides driving current to various stator coils 20, 21, and 22, connected in a "Y" configuration, as shown. The stator coils 20, 21, and 22 are connected at one end to each other, and at their respective other ends to nodes A, B, and C between the respective pairs of switching transistors 45-46; 45'-46', and 45"-46". The transistors 45, 45', 45", 46, 46' and 46" can be of known power switch FETs, or other switch devices, as desired, and are operated in a commutation sequence by control signals applied to their respective gates to supply drive currents to selected ones of the coils 20, 21, and 22, thereby defining three series current paths 30, 31, and 32 from a source of dc voltage, $V_{cc}$, on a line 33, through selected pairs of coils 20–22 and associated lower transistors 46, 46' and 46" to a reference potential or ground, on a line 34. Each current path includes the sense resistor 35, and, respectively, two switching transistors 45 and 46, 45' and 46', and 45" and 46". The sense resistor 35 is connected between the ground line 34 and a common line 37 interconnecting the three current paths 30, 31, and 32. Thus, any current flowing in any of the current paths 30–32 and in any of the coils 20–22 will also flow through the sense resistor 35.

The voltage across the sense resistor 35 and a reference voltage, $V_{REF}$, are connected respectively to the inverting and noninverting inputs of a differential amplifier 50, and the output from the amplifier 50 is connected to a gated low pass filter and hold circuit 52. More particularly, the gated low pass filter and hold circuit 52 includes an amplifier 53 having a feedback capacitor 54 connected between the output 55 and the inverting input. A resistor 56 is selectively connected in parallel with the feedback capacitor 54 by a switch 57, the switch 57 being operated in response to a signal indicating PWM motor operation applied to line 58. The switch 57 may be, for example, a transfer gate, such transfer gates being known in the art. It should be noted that the differential amplifier 50 is not strictly necessary to accomplish the desired current estimating operation of the invention, but may be included to provide an extra inversion of the input signal and possibly to refer the signals to a reference voltage other than ground.

The output from the amplifier 50 is also connected to the inverting input of the amplifier 53 by resistor 59 in series with a second switch 60, which also can be a transfer gate, also operated in response to the signal indicating PWM motor operation on line 58. Additionally, the reference voltage, $V_{REF}$, is connected to the non-inverting input of the amplifier 53.

In operation, the switches 57 and 60 are closed during normal, linear motor operation when current flowing through the motor windings 20–22 flows through the sense resistor 35. The voltage developed on the sense resistor 35 is therefore amplified and applied to the amplifier 53, with the resistor 56 connected in parallel with the capacitor 54 by switch 57, which is closed in the normal, linear mode. The amplifier circuit therefore operates as a low pass filter in this mode, and the output on the line 55 therefore represents the average current flowing in the windings 20–22 with respect to the voltage, $V_{REF}$.

On the other hand, in PWM mode, when the drive current is disconnected from the coils 20–22, a PWM signal appears on the line 58 indicating the PWM mode of operation, opening the switches 57 and 60, isolating the inverting input of the amplifier 53, and disconnecting the resistor 56 from its parallel connection across the capacitor 54. The charge which has been built up upon the capacitor 54 is therefore held, thereby holding the voltage on the output line 55 at the level it had attained during the previous linear mode cycle. The output on the line 55, therefore, always indicates the average current flowing in the coils 20–22 of the motor, regardless of the operating mode. Moreover, the correctness of the information developed at the output of the amplifier 53 is independent of the duty cycle of the PWM signal, the only effect of different duty cycle being the change in equivalent bandwidth of the circuit. An obvious consideration is that for proper operation, input bias current of the operational amplifier 53 should be zero or very small to avoid errors, especially in the "hold" mode.

Figure 2:
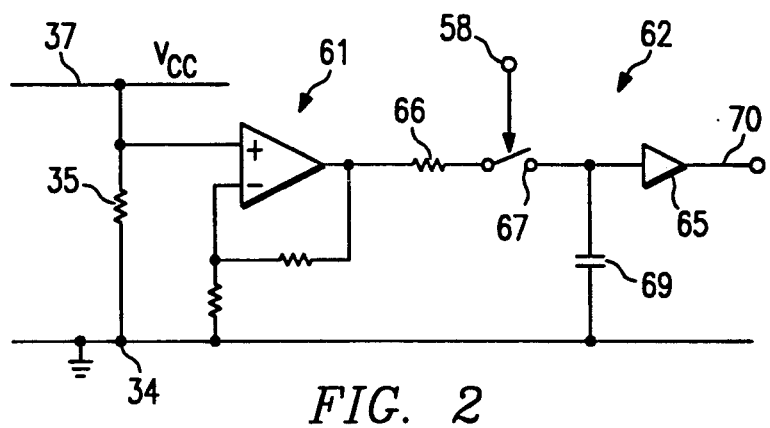
FIG. 2 is an electrical schematic diagram of a circuit for reconstructing an average load current, in accordance with another preferred embodiment of the invention.

An electrical schematic diagram of another circuit embodiment which can be used to determine an average current supplied to a load is shown in FIG. 2 to which reference is now made. In the embodiment shown, only the portion of the circuit which processes the voltage developed across the sense resistor 35 is illustrated. As shown, an amplifier circuit 61 provides an output signal representing the voltage developed across the resistor 35 to a circuit 62 that operates as a low pass filter circuit when drive current is supplied to the load, and operates as a voltage hold circuit when drive current is not supplied to the load, in a manner similar to the circuit described above with reference to FIG. 1. It should be noted those skilled in the art will recognize various other circuit embodiments which can be used to provide the function of the amplifier 61, if such amplifier is used at all.

A circuit 62 includes an amplifier 65 which receives at an input thereof the output from the amplifier 61 via a resistor 66 and switch 67, connected in series. The switch 67 is operated by the PWM signal applied to node 58, and is closed in a linear mode of operation, and is opened in a PWM mode of operation. A capacitor 69 is connected from the input of the amplifier 65 to the ground line 34.

The operation of the circuit embodiment of FIG. 2 is similar to that described above with respect to the FIG. 1 embodiment. More particularly, the switch 67 is closed during normal, linear operation when current flows through the sense resistor 35, and the voltage developed on the sense resistor 35 is amplified and applied to the input of the amplifier 65 and capacitor 69. The amplifier circuit therefore operates as a low pass filter in this mode, and the output on the line 70 therefore represents the average current flowing in the load.

On the other hand, when no current is supplied to the load, a signal appears on the line 58 opening the switch 67, isolating the input of the amplifier 65, and disconnecting the resistor 66 from the capacitor 69. The charge which had been built up upon the capacitor 69 is therefore held on the input of the amplifier 65, thereby holding the voltage on the output line 70 at the level it had attained during the cycle of the previous mode. The output on the line 55, therefore, always indicates the average current flowing in the load, regardless of the operating mode.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

I claim:

1. A circuit for providing a signal proportional to the average current flowing through coils of a motor operated in both linear and PWM modes, comprising:
   a sense resistor across which a voltage representing the drive current supplied to the coils is developed;
   an amplifier connected to receive the voltage developed across said sense resistor when said motor is operated in the linear mode;
   a capacitor and a second resistor connected to said amplifier to operate as a low pass filter circuit, and
   a switch circuit for disconnecting the voltage developed across said sense resistor from said amplifier, and for disconnecting said second resistor from said capacitor, when drive current is not supplied to said coils, to operate as a voltage hold circuit.

2. The circuit of claim 1 further comprising circuitry for applying PWM signals to said switch circuit to switch said output circuit between said low pass filter circuit and said voltage hold circuit operations.

3. The circuit of claim 2 further comprising an amplifier connected across said sense resistor having an output representing the voltage developed across said sense resistor.

4. The circuit of claim 1 wherein said motor is a polyphase dc motor.

5. The circuit of claim 4 wherein said motor is a three-phase brushless motor.

6. A circuit for providing a signal proportional to an average current switchably supplied to a load, comprising:
   a sense resistor across which a voltage representing the current applied to said load is developed;
   an amplifier having an input and an output;
   a circuit for switchably connecting the voltage developed across said resistor to the input of said amplifier when current is delivered to said load;
   a capacitor connected between the input and output of said amplifier;
   a feedback resistor;
   a switch circuit for switchably connecting said feedback resistor in parallel with said capacitor when current is applied to said load and to disconnect said feedback resistor when current is not applied to said load.

7. The circuit of claim 6 wherein said amplifier, capacitor and feedback resistor operate as a low pass filter circuit when current is applied to the load, and operate as a voltage hold circuit when no current is applied to the load.

8. The circuit of claim 7 wherein said switch circuit comprises a first switch in series with an input of said amplifier, a second switch in series with said feedback resistor, and a circuit operative to open said switches when no current is applied to said load and to close said switches when current is applied to said load.

9. The circuit of claim 8 wherein said load is coils of a polyphase dc motor.

10. The circuit of claim 9 wherein said motor is a three-phase brushless motor.

11. The circuit of claim 10 wherein current is switchably applied to said coils in a PWM mode of motor operation.

12. The circuit of claim 11 further comprising circuitry for applying PWM signals to said switch circuit to switch said amplifier, capacitor and feedback resistor between said low pass filter circuit and said voltage hold circuit operations.

13. The circuit of claim 6 further comprising a second amplifier connected across said sense resistor having an output representing the voltage developed across said sense resistor.

14. A circuit for providing a signal proportional to an average current supplied to coils of a motor operated in both linear and PWM modes, comprising:
   a sense resistor across which a voltage representing the current supplied to the coils is developed;
   a low pass filter circuit connected to receive said voltage developed across said sense resistor when said motor is operated in the linear mode, said low pass filter circuit including a capacitor and a resistor connected in parallel, and an amplifier, said capacitor being connected between an input and an output of said amplifier;

a switch circuit for disconnecting the voltage developed across said sense resistor from said low pass filter circuit, and for disconnecting said resistor from said capacitor when drive current is not supplied to said coils of said motor in the PWM mode.

15. The circuit of claim 14 wherein said switch circuit comprises a first switch in series with an input of said amplifier, a second switch in series with said feedback resistor, and a circuit operative to open said switches when no current is applied to said load and to close said switches when current is applied to said load.

16. The circuit of claim 15 further comprising circuitry for applying PWM signals to said switch circuit to operated said switch circuit.

17. The circuit of claim 14 further comprising a second amplifier connected across said sense resistor having an output representing the voltage developed across said sense resistor.

* * * * *